United States Patent [19]
Giguere

[11] 3,742,329
[45] June 26, 1973

[54] STEPPING MOTOR CONTROL INCLUDING PULSE RESPONSIVE MEANS TO DEENERGIZE PRESENTLY ENERGIZED WINDINGS WHILE DELAYING ENERGIZATION OF WINDINGS TO BE ENERGIZED

[75] Inventor: Irving Jules Giguere, Bristol, Conn.

[73] Assignee: The Superior Electric Company, Bristol, Conn.

[22] Filed: Sept. 29, 1971

[21] Appl. No.: 184,730

[52] U.S. Cl. .................................. 318/696, 318/138
[51] Int. Cl. ............................................ H02k 37/00
[58] Field of Search ............... 318/138, 254, 696, 318/685, 439

[56] References Cited
UNITED STATES PATENTS

| | | |
|---|---|---|
| 3,530,347 | 9/1970 | Newell ................................ 318/696 |
| 3,495,149 | 2/1970 | Swain ................................. 318/138 |
| 3,560,818 | 2/1971 | Amato ................................ 318/138 |
| 3,573,592 | 4/1971 | Agin .................................. 318/696 |
| 3,573,593 | 4/1971 | Beery ................................. 318/696 |
| 3,424,962 | 1/1969 | Gawron .............................. 318/138 |

*Primary Examiner*—G. R. Simmons
*Attorney*—Arthur A. Johnson and Ernest M. Junkins et al.

[57] ABSTRACT

A motor control circuit for accepting an input pulse and changing the energization of the windings of a stepping motor to produce an incremental movement. Each energization of a winding is delayed for a duration equal to the extent of the pulse which is adjustable to enable dissipation of energy in the winding being deenergized and to accommodate delay in semiconductor turn on and turn off times. The circuit includes gates and a pair of bistable means for directing the proper sequence of winding changes of energization.

9 Claims, 2 Drawing Figures

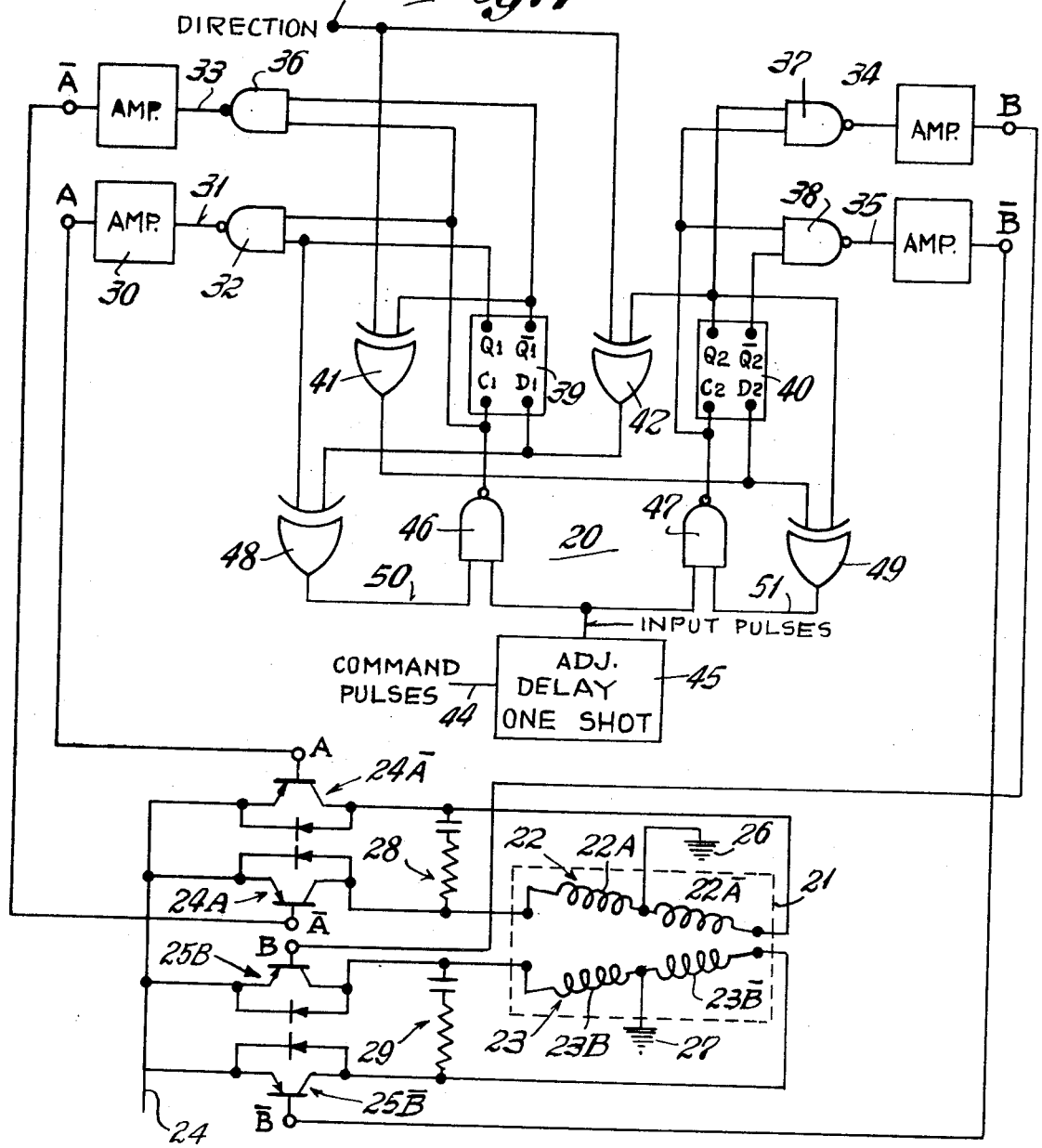

STEPPING MOTOR CONTROL INCLUDING PULSE RESPONSIVE MEANS TO DEENERGIZE PRESENTLY ENERGIZED WINDINGS WHILE DELAYING ENERGIZATION OF WINDINGS TO BE ENERGIZED

In U.S. Pat. No. 3,117,268, granted Jan. 7, 1964 and assigned to the assignee of the present invention, there is disclosed a circuit for translating an input pulse into changes of energization of the windings of a stepping motor. The windings are divided into two phases with each phase having two winding sets. The motor has a plurality of poles with there being two windings on each pole, one in each set of a phase with the windings of alternate poles being connected together into a phase to provide simultaneous energization of all poles when a winding set is energized.

If the winding sets of a phase are denoted A and $\bar{A}$ and the winding set of the other phase denoted B and $\bar{B}$, one repeatable sequence of energization consists of energizing the sets A and B, A and $\bar{B}$, $\bar{A}$ and $\bar{B}$, $\bar{A}$ and B, A and B, etc. Each change of energization thus involves deenergization of one winding set of a phase and energizing the other set while maintaining the energization of the other phase. Each change causes alternate phases to have their winding set energization changes.

While the above disclosed motor control has been found satisfactory, as it becomes desirable to increase the speed of the motor, difficulties have developed when the winding set energizations are changed. One factor results from the need to dissipate the energy in the winding set that is being deenergized before energizing the other winding set. Further, when semiconductors are utilized to control the energy to the winding sets, they require a longer time to cease conduction than to initiate conduction. Though it has been suggested to use a delay circuit, such a R.C. network in each winding set to provide a delay between deenergization and energization, this has also not been completely operative because of the inherent difference in time between the delays caused by variation in the components and the difficulty in adjusting them easily for different delay times.

It is accordingly an object of the present invention to provide a motor control circuit of the above type which provides an identical delay between the deenergization of one winding set and the energization of the other winding set in a phase.

Another object of the present invention is to provide a motor control having a delay in which the delay is easily adjusted for different operating conditions.

A further object of the present invention is to provide a motor control for a stepping motor which not only achieves the above objects, may be easily incorporated into presently existing systems and which is susceptible to being made using integrated circuits.

In carrying out the present invention, the motor control circuit includes a pair of bistable means, with one being connected to each phase to alternate the energization of the winding sets. Each input pulse is directed to one or the other of the bistable means to cause it to change its state and produce a signal to shift the energization of the winding state. Each winding set has an NAND gate and has its output connected to effect energization of the winding set with the input to the NAND gate being a signal from the bistable means and a signal from the input pulse. One NAND gate functions to deenergize its associated winding set while the NAND gate for the other winding set functions to delay energization of its associated winding set for the duration of the input pulse. As there is no change in the signals for the other phase, it retains the same energization.

For controlling the duration of the deenergization of the winding sets having their energization change, the present invention uses an adjustable mono-stable flip-flop or one-shot which accepts input command pulses over a wide range of durations and causes each input pulse to the gates to be of an identical duration thereby assuring that the duration of deenergization for each change of energization will be identical. Moreover, the duration of the deenergization may be easily adjusted to optimum operating conditions by merely adjusting the time of the one-shot as by for example adjusting an adjustable resistor manually or automatically.

Other features and advantages will hereinafter appear.

Referring to the drawing

FIG. 1 is a logic and schematic illustration of the motor control circuit of the present invention shown interconnected with a stepping motor.

FIG. 2 is an illustration showing logic states.

Referring to the drawing the motor control circuit is generally indicated by the reference numeral 20 and is utilized to control the energization of a stepping motor 21. The motor has a plurality of poles (not shown) each with a winding and some of the windings are connected together to form a first phase 22 having individually energizable winding sets 22A and 22$\bar{A}$ with the remaining windings being connected into another phase 23 also having two separately energizable winding sets 23B and 23$\bar{B}$. Each of the winding sets is connected to a source 24 of unidirectional energy by its own semi-conductor such as a transistor 24A for winding set 22A, 24$\bar{A}$ for winding set 22$\bar{A}$, 25B for winding set 23B and 25$\bar{B}$ for winding set 23$\bar{B}$. In addition, a common ground 26 is used for the winding sets 22A and 22$\bar{A}$ and another common ground 27 for winding sets 23B and 23$\bar{B}$. For a more fuller description of the motor reference is made to the above-noted U.S. Pat. No. 3,117,268.

The transistors each have a base denoted A, $\bar{A}$, B and $\bar{B}$ and these bases are connected to the similarly identified terminals A, $\bar{A}$, B and $\bar{B}$ of the motor control circuit 20, The motor 21 is incrementally moved by a change of energization of its winding with there being one winding set in each phase energized at a time and such that the sequence energization in one direction are winding sets 22A and 23B, 22A and 23$\bar{B}$, 22$\bar{A}$ and 23$\bar{B}$, 22$\bar{A}$ and 23B, 23A and 23B, etc. while if the sequence is reversed the motor will rotate in the opposite direction. For this sequence the terminals AB, A$\bar{B}$, $\bar{A}\bar{B}$, $\bar{A}$B,AB will thus have a logical 0 voltage thereon to effect the winding set energization.

It will be understood that, referring for example to the winding set 22A, it becomes energized by the terminal A having applied thereto a low or logical 0 voltage which enables it to conduct to permit current to pass from the plus source through the winding to the ground 26. As each winding set consists of pairs of windings on poles with one winding being in each set, if the change of energization consists of deenergizing the winding set 22A, and energizing winding set 22$\bar{A}$, the energy in the winding set 22A tends to maintain the pole magnetized to thereby decrease the impedance of the winding 22$\bar{A}$. This would tend to cause excessive current flow through the winding set 22Ā as only resistive impedance would be encountered which has been found to be detrimental to the transistors associated with the winding set. In order to provide a path for the energy in the winding set being deenergized, each of the phases has an R.C. network 28 and 29 associated therewith which provides a separate path for dissipating this energy.

However, the time for the energy to be dissipated by the paths 28 and 29 is such that if transistors 24A and 24Ā had their conduction simultaneously reversed that the energy in the coil being deenergized (22B) would still effect the impedance of the winding for a short period during which exceedingly heavy current would flow through transistor 24Ā which would undoubtedly damage it. Moreover, it has also been found that the time for rendering a transistor nonconducting is greater than the time for changing it from nonconducting to conducting and accordingly there is again another short period in which both transistors could be conducting, irrespective of the energy in the winding set thereby also permitting excessive damaging current flow.

The logic circuit, however, as will be hereinafter understood, when effecting a change of energization in a phase prevents for a determined time the conduction of both transistors of that phase and then effects the conduction of the transistor associated with the winding set to be energized. This selected time is made to be such as to permit the energy in the winding set being deenergized to be substantially dissipated and also to be of a duration which is longer than that required for the conducting transistor to be rendered substantially nonconducting.

In the logic circuit 20, referring specifically to the terminal A, it is connected to the output amplifier 30 which in turn is connected to the output lead 31 of an NAND gate 32. Similarly the other terminals Ā, B and B̄ are connected through amplifiers to the output leads 33, 34 and 35 of NAND gates 36, 37 and 38. Each of the NAND gates will provide a signal on their output leads either a logical 1, i.e., a high plus voltage or a logical 0, a low or zero voltage with the amplifiers amplifying the same signal. An output lead having a 0 will cause its associated transistor to become conducting while a logical 1 on the output leads 31 and 33-35 of the NAND gates renders each associated transistor nonconducting.

The logic circuit further includes a pair of bistable means 39 and 40, each of which has terminals denoted Q1, Q̄1, C1 and D1 for the bistable means 39 and Q2 and Q̄2, C2 and D2 for the bistable means 40. The bistable means are of the delay or D type in that they are edge triggered flip-flops in which a change from 1 to 0 logically on the terminal C will cause the terminal Q to be 1 if D is a 1 with Q̄ becoming 0, while if D is a 0 when C is triggered by a positive trigger pulse, Q will become 0 and Q̄ will become 1. Such devices are available in TTL integrated circuits from Texas Instruments and denoted by a number 7474.

For controlling the logic state at the terminals D1 and D2 there is provided a pair of state gates consisting of exclusive OR gates 41 and 42. The gate 41 has a pair of inputs with one input being connected to a direction information terminal 43 and its other input being connected to the terminal Q̄1 while the other exclusive OR gate 42 also has one input connected to the directional input terminal 43 and its other input connected to the terminal Q2. The output from the gate 42 is connected to the terminal D1 of bistable means 39 while the output of the gate 41 is connected to the terminal D2 of bistable means 40.

Additional information to the motor control circuit appears as command pulses on a lead 44 with each pulse actuating an adjustable delay mono-stable vibrator or one-shot 45 to produce an input pulse for each command pulse and the input pulses are directed as inputs to shifting NAND gates 46 and 47. The output from the gate 46 is connected to the terminal C1 and also to an input of each of the conduction gates 32 and 36, while the output from the shifting gate 47 is connected to the terminal C2 and also to an input of each conduction gate 37 and 38.

It will be understood that when the output of gate 46, for example, changes from a logical 1 to 0, i.e., a low to high positive voltage, that the bistable means 39 will copy the state of the logic state at the terminal D1 to cause either Q or Q̄ to become 1 and the other 0. Similarly, the output from the gate 47 causes the state of the bistable means 40 to adopt that which the logic state terminal D has. The change of state from 0 to 1 on the output of either of gates 46 and 47 has no effect on their respective bistable means.

Another pair of exclusive OR gates are indicated by the reference numerals 48 and 49 and these may be conveniently termed steering gates as they control the output of shifting gates 46 and 47 with respect to which is to react for each input pulse from the one-shot 45.

The gate 46 in addition to having an input connected to the one-shot 45 also has an input connected to the output of gate 48 over a lead 50 while the gate 47 has an input connected to the output of the gate 49 over a lead 51.

With respect to the conduction gates 32 and 36 the gate 32 has an input connected to the terminal C and also an input connected to the terminal Q1 while the gate 36 also has a connection to the terminal C and an input connected to the terminal Q̄1. Similarly, the conduction gates 37 and 38 each have an input connected to the terminal C2 and another input connected to the terminals Q2 and Q̄2, respectively.

It will be understood that each of the NAND gates such as gate 32 will produce a 1 as an output if one or more of its inputs are 0 and will only produce a 0 or low output if all its inputs are 1 or high. In addition, the exclusive OR gate, such as the gate 41 will produce a high output or 1 if the two inputs are different and will produce a 0 or low output if its inputs are the same. For example, in the exclusive OR gate, with two 0 inputs or two 1 inputs the output is 0 while with a 1 and 0 or 0 and 1 input the output is each 1.

In the operation of the circuit of the present invention, command pulses to cause the motor to incrementally move are provided on the lead 44 as depicted in FIG. 2 opposite the notation "command pulses." Also, the direction information terminal 43, if at a low or zero voltage or logical 0 commands the logic circuit to direct the motor in a forward direction while if a high positive voltage or logical 1 is applied thereto the sequence of changes of energization of the winding sets will be reversed and hence cause the motor to move in reverse direction.

In the operation of the circuit assuming that the direction terminal 43 is 0 and that the winding sets 22A and 23B are energized, the condition is represented by the reference numeral 1 opposite the indication of the "+direction input pulses" in FIG. 2 with the input pulses being the output of the adjustable one-shot 45. In this Figure, the high points of the pulse representation are assumed to be logical 1 and the low points a logical 0. The winding sets 22A and 23B are maintained energized by the outputs of the conduction gates 32, 36, 37 and 38 being 0, 1, 0 and 1 respectively; Q1 being a 1 and $\overline{Q1}$ being a 0 for bistable means 39 and Q2 being a 1 and $\overline{Q2}$ being a 0 for bistable means 40. In addition, the state gate 42 has a 0 and 1 input causing D1 to be a 1 while state gate 41 has both 0 inputs causing the terminal D2 to be a 0. In addition, the output of the shifting gate 46 and hence the terminal C, is a 1 by reason of lead 50 being a 0 and the input pulse also being a 0 (at the point 1 in FIG. 2) while the shifting gate 47 makes C2 a 1 by also having the input pulse a 0 and the lead 51 a 1.

The winding 22A is energized in view of the conduction gate 32 having a 0 output by reason of both its inputs (C1 and Q1) being a 1 which is also true for the gate 37 (C2 and Q2) and hence the latter gate energizes the winding 23B while the gates 36 and 38 each have a 0 and 1 input which produces a 1 output and prevents conduction of the transistors associated therewith.

Upon a command pulse being applied on the lead 44, the leading edge thereof triggers the one-shot 45 to change its output from a 0 to a 1 as indicated by the point 2 on the +direction input pulse diagram (FIG. 2) which maintains the output of the gate 46 a 1 in view of its inputs being a 0 and a 1 and accordingly there is no change on the inputs to the gates 32 and 36 so the gate 32 thus maintains the winding 22A energized. However, the gate 47 changes its output to a 0 by reason of both inputs being a 1 which in turn not only makes C2 a 0 but also makes an input of each of the gates 37 and 38 a 0. Irrespective of the other input to these two gates, when one input is a 0 it causes the output of the gates 37 and 38 to be a 1 to thereby deenergize the winding B and prevents energization of winding $\overline{B}$ for the duration of time that the pulse from the one-shot 45 is at a 1 or high voltage level.

After this duration, the pulse shifts from a 1 to a 0 as indicated by the point 3 on the input pulse chart and this in turn causes the output of gate 47 to shift to the 1 state causing the bistable means 40 to copy the state on the terminal D2 which is a 0 state and this in turn produces on the gate 38 two 1 inputs resulting in a 0 output on the output lead 35 with consequent energization of the winding 23$\overline{B}$. The terminal D2 was a 0 prior to the pulse at point 2 by reason of state gate 41 having two 0 inputs.

In addition, the change in the states of Q2 and $\overline{Q2}$ of bistable means 40 changes the state of D1 to a 0 by state gate 42 and the logic of lead 50 to a 1 while steering gate 48 changes the state of lead 51 to a 0 gate 49 so that with the leading edge of the next input pulse, indicated by the point 4 on the diagram, the gate 46 will have a 0 output deenergizing the winding A and preventing energization of the winding 22 $\overline{A}$ for the duration of the pulse. The leading edge does not affect the energized winding of the phase 23 which maintains the winding 23 $\overline{B}$ energized. Upon the adjustable delay shifting from a 1 to a 0 indicated by the point 5 the bistable means 39 will shift its state so that Q1 becomes a 0 and $\overline{Q1}$ a 1 effecting energization of the winding 22 $\overline{A}$ by the lead 33 becoming a 0.

The following chart sets forth the logical states for the different points indicated on the plus direction input pulse and the minus direction input pulse with respect to the windings being energized as indicated by the letter E or deenergized as indicated by the letter D.

CHART OF LOGIC STATES

| Points | 1 | 2 | 3 | 4 | 5 | 6 | 7 | 8 | 1 | 9 | 10 | 11 | 12 | 13 | 14 | 15 |
|---|---|---|---|---|---|---|---|---|---|---|---|---|---|---|---|---|
| Direction | 0 | 0 | 0 | 0 | 0 | 0 | 0 | 0 | 1 | 1 | 1 | 1 | 1 | 1 | 1 | 1 |
| Input pulse | 0 | 1 | 0 | 1 | 0 | 1 | 0 | 1 | 0 | 1 | 0 | 1 | 0 | 1 | 0 | 1 |
| Winding 22A | E | E | E | D | D | D | D | D | E | D | D | D | D | D | E | E |
| Winding 22$\overline{A}$ | D | D | D | D | E | E | E | D | D | D | E | E | E | D | D | D |
| Winding 23B | E | D | D | D | D | E | E | E | E | E | E | D | D | D | D | D |
| Winding 23$\overline{B}$ | D | D | E | E | E | D | D | D | D | D | D | D | E | E | E | D |
| Outputs 31 | 0 | 0 | 0 | 1 | 1 | 1 | 1 | 1 | 0 | 1 | 1 | 1 | 1 | 1 | 0 | 0 |
| Outputs 33 | 1 | 1 | 1 | 1 | 0 | 0 | 0 | 1 | 1 | 1 | 0 | 0 | 0 | 1 | 1 | 1 |
| Outputs 34 | 0 | 1 | 1 | 1 | 1 | 1 | 0 | 0 | 0 | 0 | 0 | 1 | 1 | 1 | 1 | 1 |
| Outputs 35 | 1 | 1 | 0 | 0 | 0 | 1 | 1 | 1 | 1 | 1 | 1 | 0 | 0 | 0 | 0 | 1 |
| Terminals Q1 | 1 | 1 | 1 | 1 | 0 | 0 | 0 | 0 | 1 | 1 | 0 | 0 | 0 | 0 | 1 | 1 |
| Terminals $\overline{Q1}$ | 0 | 0 | 0 | 0 | 1 | 1 | 1 | 1 | 0 | 0 | 1 | 1 | 1 | 1 | 0 | 0 |
| Terminals C1 | 1 | 1 | 1 | 0 | 1 | 1 | 1 | 0 | 1 | 0 | 1 | 1 | 1 | 0 | 1 | 1 |
| Terminals D1 | 1 | 1 | 0 | 0 | 0 | 0 | 1 | 1 | 0 | 0 | 0 | 0 | 0 | 1 | 1 | 1 |
| Terminals Q2 | 1 | 1 | 0 | 0 | 0 | 0 | 1 | 1 | 1 | 1 | 1 | 1 | 0 | 0 | 0 | 0 |
| Terminals $\overline{Q2}$ | 0 | 0 | 1 | 1 | 1 | 1 | 0 | 0 | 0 | 0 | 0 | 0 | 1 | 1 | 1 | 1 |
| Terminals C2 | 1 | 0 | 1 | 1 | 1 | 0 | 1 | 1 | 1 | 1 | 1 | 0 | 1 | 1 | 1 | 0 |
| Terminals D2 | 0 | 0 | 0 | 0 | 1 | 1 | 1 | 1 | 1 | 0 | 0 | 0 | 0 | 1 | 1 | 1 |
| Leads 50 | 0 | 0 | 1 | 1 | 1 | 0 | 1 | 1 | 1 | 0 | 0 | 1 | 1 | 0 | 0 | 0 |
| Leads 51 | 1 | 1 | 0 | 0 | 1 | 1 | 0 | 0 | 0 | 1 | 1 | 0 | 0 | 0 | 1 | 1 |

It will be seen that as the points progress from 1 through 8 in the plus direction input pulse diagram the windings will be energized in the sequence 22a 23b, 22a 23$\overline{b}$, 22$\overline{a}$ 23$\overline{b}$, and 22$\overline{a}$ 23b, etc., while for the points 1 and 9 through 15 indicated on the minus direction input pulse diagram a reverse sequence is effected. In both instances the phase which is having its winding sets energization altered is maintained deenergized for the extent of time that adjustable delay 45 causes the input pulse to the shifting gates 46 and 47 to be high or 1 while unaffecting the other phase which is not having its windings sets energization changed.

It will be understood that the one-shot delay 45 includes an adjustable resistor or other device for effecting the duration of the pulse therefrom and that a pulse of the selected duration is applied every time that there is a change of energization of the windings to produce a step. Moreover, as the adjustable delay 45 applies the delay to both phases and also to both winding sets in each phase then the duration for the deenergization of the phase is the same for both as the adjustable delay duration remains essentially constant for each pulse. However, only the pulse having its energization winding set of each phase being energized at a time. The herein disclosed circuit provides for deenergizing completely the phase having its energization changed for a length of time that is easily adjustable and is the same for all phases. This is achieved by the use of an adjustable one-shot delay which accepts each command pulse and shapes the pulse to have a selected delay. As each pulse controls for the extent of time of its duration the time that a phase is maintained deenergized and as this delay is the same for each pulse then irrespective of which phase is being changed the delay remains constant. Moreover, the present circuit utilizes a pair of bistable means to one being connected to each phase and with the state of the bistable means controlling which winding set of the phase is to be energized together with controlling the states of the bistable means by sensing the state of the other bistable means so that the desired sequence of operation for each command pulse will be achieved.

Variations and modifications may be made within the scope of the claims and portions of the improvements may be used without others.

I claim:

1. In a motor control circuit for use with a stepping motor for translating each input pulse to the control circuit into a change of energization of windings of the motor, said motor windings being connected into a plurality of phases with each change of energization altering the energization in a phase by deenergizing some windings of the phase and energizing other windings, the improvement comprising means for causing each input pulse to have a definite duration and means for deenergizing the some windings and delaying the energization of the other windings of the phase for the duration of the pulse.

2. The invention as defined in claim 1 in which the system is responsive to command pulses having a duration different than the input pulse and there are means for receiving each command pulse and shaping it into an input pulse having a determined duration.

3. The invention as defined in claim 2 in which the pulse shaping means includes a monostable flip-flop having an output that constitutes the input pulse to the system.

changed is effected.

While it has heretofore been mentioned that the bistable means 39 and 40 may consist of integrated circuits having a specific serial number it will also be understood that the gates may also consist of integrated circuits thereby enabling the present motor control circuit to be relatively economically manufactured.

It will accordingly be appreciated that there has been disclosed a motor control circuit for use with a stepping motor having a plurality of phases with each phase having a plurality of winding sets. The motor is stepped by changing the energization to the phases with only one 4. The invention as defined in claim 2 in which the receiving and shaping means includes means for adjusting the determined duration.

5. The invention as defined in claim 1 in which each winding set is connected to a source of energy through a semiconductor, means causing each semiconductor to be rendered non-conducting upon receipt of one logical binary signal and to be rendered conducting upon receipt of the other logical binary signal and means for receiving at least some of said input pulses and always producing the one signal for the duration of the received input pulse.

6. The invention as defined in claim 5 in which the last named means includes a logic gate having an input controllably connected to receive input pulses and another input connected to receive instructions to cause the gate to produce the one or other binary signal with the instructions determining the signal in the absence of a pulse.

7. The invention as defined in claim 5 in which there are two phases and in which there are shifting means for conducting each input pulse to all the input pulse receiving means for the phase having its energization changed.

8. The invention as defined in claim 7 in which the shifting means includes two gates, each having two inputs, in which one input of each is connected to receive the input pulse and in which the other input is connected to steering means for producing a signal which causes one shifting gate to change its output while preventing the other shifting gate from altering its output for the duration of the input pulse.

9. The invention as defined in claim 2 in which the circuit includes a direction terminal for receiving either one or the other of two binary representations in which the windings are energized in a repeatable sequence to cause the stepping motor to move in one direction and a reversal of the replatable sequence to cause the motor to move in the opposite direction and means for receiving the direction representation and causing said circuit to provide the repeatable sequence dictated by the direction representation.

* * * * *